Feb. 18, 1941.  H. H. COUCH  2,231,888
PROPELLER AND METHOD OF MAKING SAME
Filed June 15, 1936   3 Sheets-Sheet 1
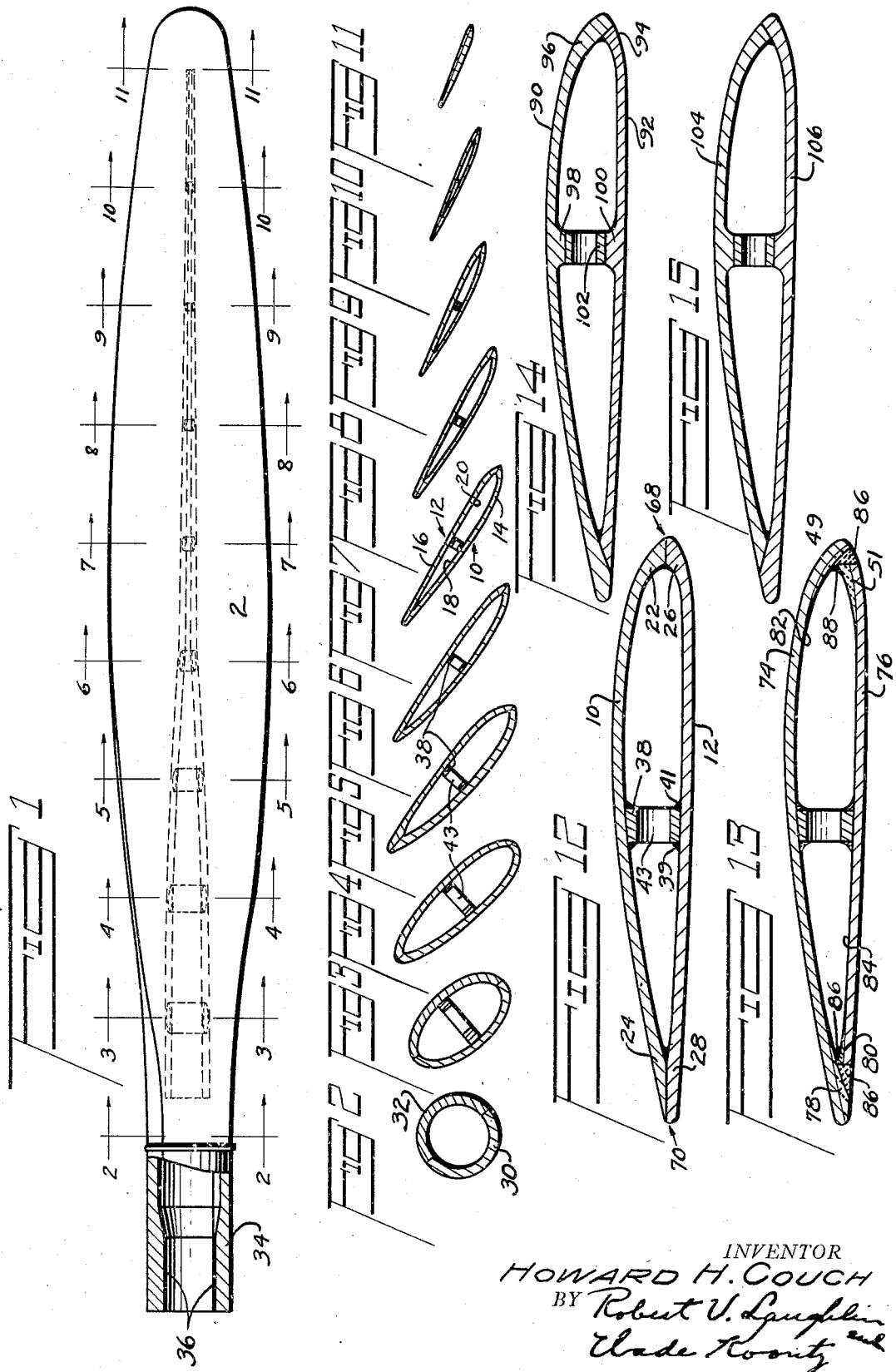
INVENTOR
HOWARD H. COUCH
BY Robert V. Laughlin
Clade Koontz
ATTORNEYS

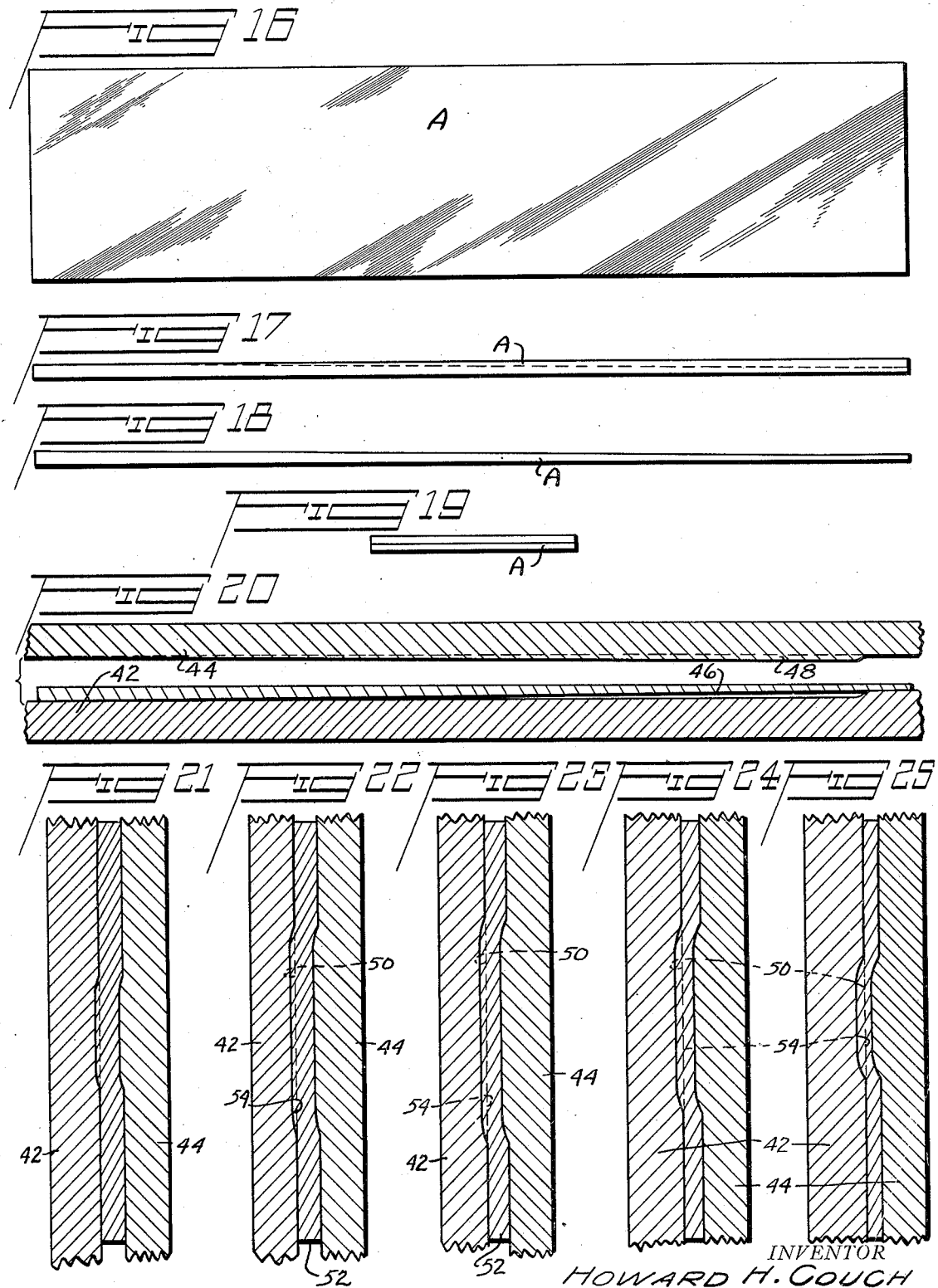

Feb. 18, 1941.   H. H. COUCH   2,231,888
PROPELLER AND METHOD OF MAKING SAME
Filed June 15, 1936   3 Sheets-Sheet 3
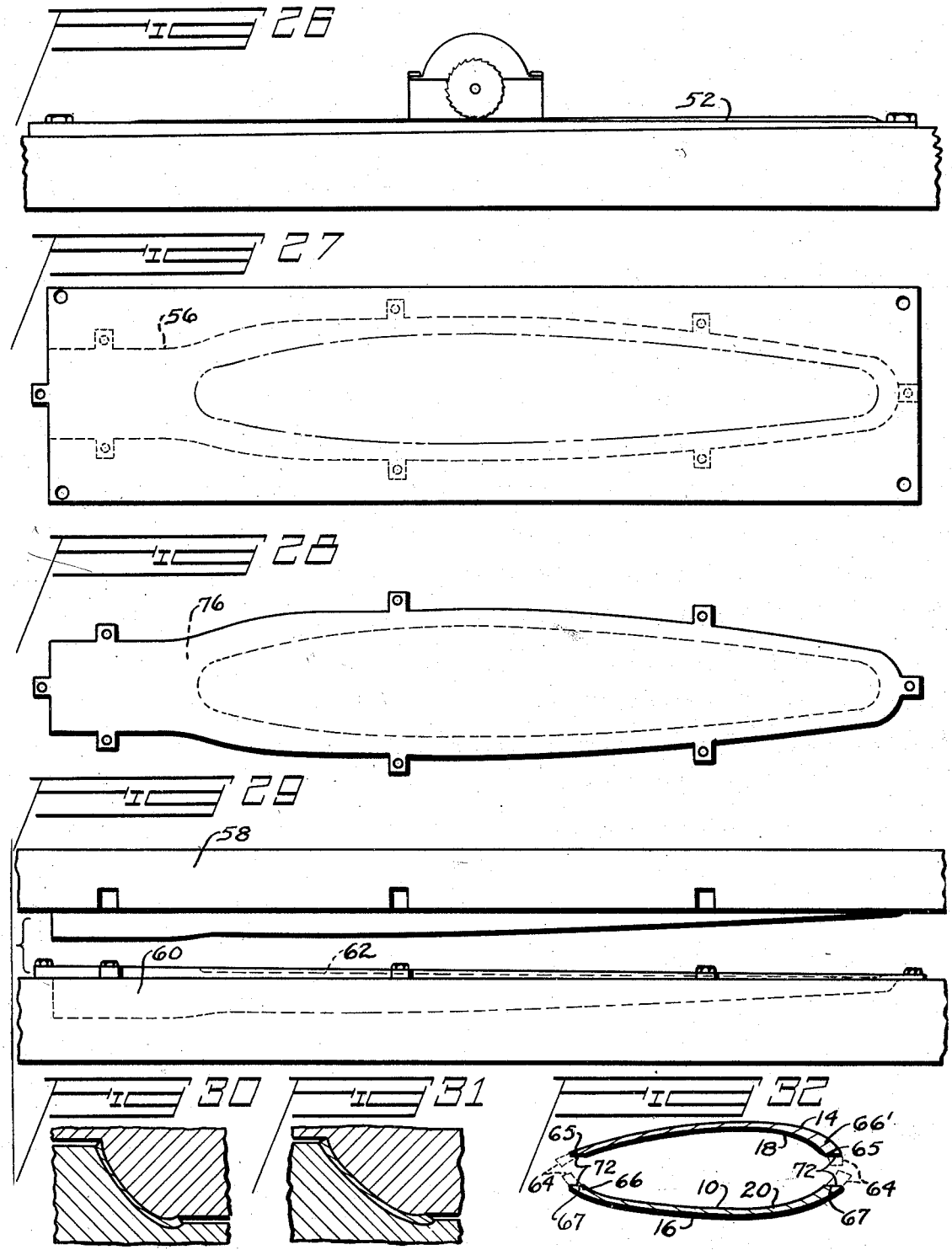
INVENTOR
HOWARD H. COUCH
BY Robert V. Laughlin
and Wade Koontz
ATTORNEYS Patented Feb. 18, 1941

2,231,888

UNITED STATES PATENT OFFICE 2,231,888

PROPELLER AND METHOD OF MAKING SAME

Howard H. Couch, Fairfield, Ohio

Application June 15, 1936, Serial No. 85,307

18 Claims. (Cl. 29—156.8)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to aircraft propellers and more particularly to the construction and method of making hollow blades for such propellers.

Heretofore, hollow steel blales were manufactured from a sheet or sheets of metal of uniform thickness or tapered sheets and united in various manners at the leading or trailing edges of the blade or slightly inward thereof. All of the prior art structures were objectionable in that they did not meet the rigid requirements for an aircraft propeller in certain and various particulars. In such prior art structures where the edges of the sections are folded to form the leading and trailing edges of the blade and where weld metal is used for uniting the adjoining edges, incipient hair-line cracks of different magnitudes are produced upon contraction of the weld metal in cooling where localized stresses occurred either in the weld metal or between the weld metal and the virgin plate metal. These incipient cracks obviously weaken the structure and constitute stress concentration points at the end of the cracks and adjacent the weld so that the propeller blade will be highly stressed at these points, resulting in failure if the stress is too great.

It is therefore an object of my invention to overcome such disadvantages by providing blade sections of greater thickness along the leading and trailing edges where the weld is formed, in this way compensating for such incipient cracks as may be produced by the weld in contracting, the thickness of the metal at these points being such that the concentration of the stresses will be lowered to a value below the endurance limit of the material used in the blade.

A further object of my invention is to eliminate such incipient cracks by welding the same with a material that penetrates therein through capillary attraction.

A further object of the invention is to reduce the stress concentration at the junction of the metal sections by providing a fillet that will cause a distribution of the stresses at such points when the blade is in operation.

It is also found, in welding the edges of the metal blades of uniform cross-sectional thickness by gradual deposition of weld metal in the recess formed between the edge face of one plate and the inner face of the other plate in accordance with prior art practices, that the varying expansion of the heated portions caused the metal edges in the vicinity of the weld to warp or distort in the direction of least heat expansion so that in finishing the leading and trailing edge portions of the blade by well-known processes, such as by grinding the respective outer surfaces of said edges to conform to the specified airfoil sections, the thickness of the metal plates at the edge portions were reduced to values below the required thicknesses of the plates. This objection has been overcome by thickening the inner surfaces of the metal plates to such an extent that the additional rigidity due to thickening tends to resist excessive warping due to heat expansion and slight warping, which might occur with the consequent removal of metal in finishing to obtain the airfoil sections, is more than compensated for by the additional thickness. Increasing of the thickness also decreases the localized stresses internally of the blade at the joint and particularly where incipient cracks are produced either in welding or sharply bending and also decreases warping tendencies that occur during heat treatment of the fabricated blade.

My invention has for a further object the provision of a hollow blade in which the proportion of weld metal or spelter used in the fabrication of the blades is kept at a minimum. The welding material constituting a negligible portion of the blade makes it possible to construct the parts of the blade to precise dimensions and in such a manner that the configuration of the blade parts are not distorted by the application of the weld metal in the process of manufacture with the result that greater uniformity in the completed blades can be obtained.

The thickening of the edge portions affords sufficient surface contacting areas between the adjoining plates such that the stress is sufficiently distributed to reduce the various stresses at the juncture to such a value that the blade will withstand the different maximum allowable stresses to which it may be subject in operation.

The provision of relatively large contacting areas permits the use of welding material of substantially lower strength values than that of the blade metal itself. It also makes possible the use of welding materials or solders that have a melting point sufficiently lower than the blade metal such that the blade metal can be heated to a temperature where the metal of the blade will not melt but which will cause the welding material to flow between and wet the contacting surfaces to provide a welded joint and fillets at the inner junction of the joint.

My invention contemplates broadly the constuction of a hollow blade from two metal sheets having transverse tapering sections and either or both tapering longitudinally, the longitudinal tapering sections decreasing in thickness substantially throughout the length thereof and the transverse tapering sections increasing in thickness outwardly from the central portion towards the edges, so that when said sheets are formed to the desired contours the maximum thickness of said transverse tapers will constitute part of the adjoining areas, and the tapers of either or both of said sheets or any combination thereof will constitute the leading and trailing edge portions of the blade.

Referring to the drawings:

Fig. 1 is a plan view of a blade made in accordance with my invention and embodying certain novel features thereof;

Figs. 2 to 11 inclusive are sectional views of the blade of Fig. 1 on lines 2—2 to 11—11 of Fig. 1;

Fig. 12 is an enlarged view of blade section corresponding to Fig. 6;

Figs. 13 to 15 inclusive are views similar to Fig. 12 showing different embodiments of my invention;

Fig. 16 is a plan view of a metal blank;

Fig. 17 is a side elevational view of Fig. 16;

Fig. 18 is a side elevational view of the blank formed into a taper;

Fig. 19 is an end view of Fig. 18;

Fig. 20 is a sectional fragmentary view of a pair of dies for deforming the tapered blank shown separated with the tapered blank therebetween;

Figs. 21 to 25 inclusive are enlarged fragmentary sectional views showing different sections progressively along the tapered blade as deformed by the die;

Fig. 26 is an elevational view showing the deformed tapered blank in position on a milling machine;

Fig. 27 is a plan view of the metal blank showing in dash and dotted outline the portion of the blank form from which metal has been removed and also in dotted line the trimming margin;

Fig. 28 is a top plan view showing the blank trimmed to rough shape;

Fig. 29 is a side elevational fragmentary view of a pair of spaced shaping dies for deforming the metal blank to final deformed shape;

Figs. 30 and 31 are sectional fragmentary views showing different sections of the metal blank deformed by the die to final camber; and Fig. 32 is a sectional view of the camber members showing in dotted line the edge portions thereof to be trimmed away prior to final assembly.

In one embodiment of my invention, and as illustrated in Figs. 1 to 12, the blade is constructed from two metal blanks, each blank being provided with complemental blade and shank portions that are united to constitute the shank and blade portions of the propeller blade.

The blade comprises a blade portion 2 and a shank portion 4. The blade is made up of two cambered members 10 and 12 that are jointed with their edges in abutting relation. The section 10 is formed curved to provide the suction surface 14 of the blade portion and the section 12 is formed to provide the thrust surface 16 of the blade portion. The outer surface 18 and suction surface 14 of camber member 10, as well as the inner surface 20 and the thrust surface 16 of section 12, are of different curvature throughout substantially the length of the blade portion such as to provide each transverse section of member 10 with tapers 22 and 24, and member 12 with tapers 26 and 28, increasing in thickness from the region of maximum camber of said members outwardly towards the joint of the leading and trailing edge portions of said members.

As illustrated in this embodiment, each of said members has its maximum plate thickness on each side of the innermost point of contact of the joint, and tapers outwardly therefrom toward the leading and trailing edges. These tapers constitute the leading and trailing edge portions of the blade. The curvature of the inner and outer contours of the transverse sections of each of said members 10 and 12 are such that the inner and outer contours of one member substantially merge into the corresponding contours of the other. In this embodiment, all of the contours of the different transverse sections of said members along the blade portion terminate approximately in the plane including the minor axes of bending of the blade, i. e., the perimeters of the surfaces of both members when assembled will lie approximately in the same helical path that includes the minor axes of bending.

The complemental shank portions 30 and 32 of the suction and thrust members 10 and 12 respectively fair into their respective blade portions and are formed into semi-cylindrical shape by the same forming operation employed in shaping the corresponding blade portions into their required contour shapes.

The complemental blade and shank portions of the blade are preferably united by copper brazing in a furnace having a controlled reducing atmosphere, and in a manner more particularly described hereinafter.

The root end 34 of the blade is upset to provide a flange engaging portion 36 that projects inwardly of the blade. If desired, the hub engaging portion may be formed so that the flange will project outwardly, it being understood that the mounting end of the blade may be varied to meet different forms of mountings. The forming of the flange portion is preferably accomplished by upsetting the complemental shank portions individually and after they are formed into semi-cylindrical portions. Any suitable upsetting apparatus may be used for this purpose, the shape and form of the dies, in case die-forging is employed, depending upon whether the hub engaging flange extends inwardly or outwardly of the shank and upon whether the forming of the flange is accomplished before or after the two sections are assembled.

It is found desirable in connection with large blades to provide a central longitudinal internal rib or spar for increasing the strength of such blades to the desired value. For this purpose and as illustrated herein, use is made of a web or rib formed as a separate element or as an integral part of one or both of said members. As shown in Figs. 1 to 12, a web 38 is formed from a rod or bar into the desired shape, preferably tapering both in width and thickness throughout the length and extending substantially throughout the length of the blade from the shank and toward the tip end of the blade. The web is first united with one of the members 10 and 12, preferably member 12 because of its flatter inner surface 20, thus making fabrication more easily accomplished. The bond between the member 12 and web 38 is formed by means of inlaid weld metal along the opposite seams 39 and 41 at the joint. Thereafter the web is united with the other member 10. As illustrated in this embodiment, it is united by copper brazing to said member 10 at the same time the adjoining edges of the members 10 and 12 are copper brazed, as more particularly described hereinafter.

A contacting area of suitable dimensions for obtaining a strong bond between the contacting surfaces of the web 38 and the member 10 is made possible by making the width of the web greater than that required for the desired strength, but removing excess metal by the provision of lightening holes 43 throughout a greater portion of the length of the web without decreasing the strength properties to values lower than that required.

In the method of manufacture of blades of this character, and as illustrated herein, the same process is utilized in forming the two members 10 and 12. A description of the steps of the process employed as applied to one of said members should therefore suffice for both. The blank from which the member 10, for example, is formed is shown in Figs. 16 and 17 as a rolled sheet of uniform thickness which is formed into a taper, as shown in Figs. 18 and 19, either by a rolling or by a milling operation. It will, of course, be understood that in rolling the sheet into a taper, the length of the sheet will be somewhat lengthened and therefore to that extent the sheet can initially be made smaller, thereby effecting a saving of material. However, the milling operation is preferred as it is more economical. The tapered sheet or blank A is placed between a pair of dies 42 and 44, Fig. 20, of a deforming machine and held by bolts or suitable means to die 42 with the blank extending over a cavity 46 in the die 42. The die having a projecting boss 48 is then pressed down on the sheet, deforming the same, throughout a portion of the length thereof corresponding substantially to the length and width of the blade portion. The male and female portions of the dies 42 and 44 are formed in such a manner that the ratio of deformation to the thickness of the tapering sheet at each cross-section thereof increases from the shank portion to the tip portion of the sheet, as shown by dotted lines 54 in Figs. 21 to 25, so that, after the protruding metal of the deformed portion 50 is removed by milling, as shown in Fig. 26, the sheet will be formed with an edge portion 52 that decreases in thickness substantially throughout the effective length of the blade portion to a lesser extent than that portion of the sheet that is bounded by the edge portion 52. The blank or sheet is then trimmed to a rough shape as by cutting or stamping along the dotted line 56 (Fig. 27) preparatory to forming the sheet into the desired and necessary contour for the particular section that is being formed, Fig. 28, showing the blank as it appears after the trimming operation. The sheet is then placed between a pair of shaping dies 58 and 60, (Fig. 29) and is fixedly supported in place upon the female die 60 with the cavity 62 of the centrally deformed portion presenting toward the male die, and is further deformed into the desired shape and contour, as shown by the sectional views in Figs. 30 and 31.

As illustrated in certain of the embodiments of my invention, the edge portions of the camber and thrust members of the blade meet in surface abutting relation. In such embodiments, the edge portions of said members are trimmed and machined so that either or both of the edge portions of said members constitute leading and trailing edge portions of the blade and the area of contact will have a transverse extent that is equal at least to the maximum thickness of the metal of at least one of said members.

As shown in Fig. 32, the edge portion of the deformed sheet after the final die shaping step is scarfed or beveled to remove the metal in the dotted line portions 64. The diagonal surface 65 from the inner surface 18 to the outer surface 14 and the diagonal surface 67 from the inner surface 20 to the outer surface 16 provide the edge portions with tapers 66 and 66' that constitute the leading and trailing edge portions 68 and 70 of the blade (Fig. 12) and provide a contact area therebetween having a transverse extent that is greater than the maximum metal thickness of either section. In this embodiment, contacting surfaces 72 have their perimeters lying substantially in the helical path that includes the neutral axes of bending.

In certain of the embodiments of my invention either of the members constituting the blade may have its edge portion so constructed and arranged as to constitute the leading and trailing edges of the blade or a portion of the leading and trailing edges of the blade that is considerably greater than that of the other member. With such arrangements, the process of construction will be substantially the same, but the dimensions will be varied so that one member will be disposed within the other substantially throughout the length of the blade as shown in Figs. 13, 14 and 15, wherein the camber and thrust members are constructed and arranged as inner and outer members and vice versa respectively. It will, of course, be understood that the blade members can be so processed that only the blade portion of one of said members or the leading or trailing edge portion of one member will be disposed within the corresponding portions of the other. In such cases the shank portions of said members may be made into similar semi-cylindrical cross-sections by varying the dimensions of the sections of the blade through which the transition occurs from unequal cross-sectional sizes at the blade portions to substantially equal size in cross-section at the shank portion.

If desired, the angular relation of the surfaces of contact between adjoining edge portions on opposite sides of the blade at the shank portion may be varied and caused to lie in the plane of symmetry, in planes parallel or at angles thereto depending on the initial cross-sectional dimension of the blanks and the contacting area desired between the adjoining surfaces thereof.

A further embodiment of my invention is illustrated in Fig. 13. This embodiment is distinguished from that shown in Figs. 1 to 12 in that the edge portion of camber member 74 substantially throughout the length of the blade portion extends over the edge portion of the thrust member 76 and constitutes the leading and trailing edge portions of the blade. In this instance and by way of example, greater metal thickness at the edge portions of the camber members is obtained by depositing layers of weld metal 78, 80 along the margin of the inner surfaces 82 and 84 of camber members 74 and 76, respectively. The weld metal is worked by suitable finishing operations as by grinding to produce smooth surfaces. The marginal inter-space between the adjoining edges of the camber sections is filled with a further marginal layer of weld metal 86 for uniting the edges and completing the thrust face of the blade. A copper fillet 88 is provided at the line of contact of the inner surfaces of the camber members by placing copper wire or copper paste at the inner crevice formed by the meeting inner surfaces. This copper fillet is produced in a hydrogen furnace after the camber members have been united.

One embodiment of my invention is shown in Fig. 14. In this embodiment the construction of the camber members 90 and 92 is similar to that shown in Fig. 13 except that instead of providing a marginal layer of inlaid metal to complete the thrust camber, this section is formed with a tapering edge portion 94 that complements the tapering edge portion 96 of the camber member 92 to provide intimate contacting areas that are united by copper-hydrogen-brazing process. It will be noted that the camber members 90 and 92 are provided with ribs 98 and 100, respectively, that are formed integral with blade sections at the same time of forming the thickened edge portions 94 and 96, which, in this instance, are produced in the same manner as that described in connection with Figs. 1 to 12. A spar 102 is arranged between the ribs 98 and 100 substantially throughout the lengths thereof and is united thereto by copper hydrogen brazing.

In Fig. 15 an embodiment is shown which is identical in construction to that of Fig. 14 except that the thrust camber 106 has its edge portion constituting the leading and trailing edges of the blade.

While various suitable metals may be used for brazing in a furnace with controlled reducing atmospheres, copper is preferably made use of because of the ease with which it flows upon and wets a hot iron surface and also because of its affinity for iron. It is important that the copper shall have a clean surface upon which to flow and this is accomplished by using a hydrogen atmosphere or any other oxygen free atmosphere in the brazing furnace which will remove oxide impurities and prevent oxidation under heat. Prior to placing the two parts constituting the blade into the furnace the adjoining portions thereof are smoothly machined so that the gap in the joint is not excessive. It is well known that within certain limits the capillary force will draw the molten copper into the joint to produce an alloy of copper and iron at the brazing temperature (about 2050°), that is only skin deep, but which provides a bond of a strength that cannot be obtained with ordinary torch welding where the bonding metal is employed as a filler that serves to "paste" the surfaces together.

In preparing the joint for copper brazing the two parts are clamped together by weighting with blade parts held in a fixture, or by other suitable means, or they may be tack welded at spaced points to bring the adjoining surfaces into intimate contact and either a paste made of copper dust, or a copper wire is placed adjacent the seam and preferably within the blade to provide fillets 88. The assembly is then placed in a hydrogen furnace and brazed in accordance with the well-known temperature and time control in copper brazing processes of this character, it being understood that the quantity of copper used for the joint and the brazing temperature shall preferably be of such values as to provide fillets of appreciable size.

It is preferred to use an alloy steel such as S. A. E. 4640, which is free from chromium, in my process of manufacture in which the blade sections are jointed together by copper brazing in a reducing atmosphere. The presence of chromium in amounts materially greater than one per cent will prevent good brazing. However, up to about one per cent of chromium a good copper braze is obtainable provided a flux is used. It will, of course, be understood that various other alloy steels having dissoluble properties may be used.

It will be understood that I do not intend to limit my invention to the particular embodiments disclosed, as various changes in the structures and methods disclosed can be made by those skilled in the art without departing from my invention and I therefore intend that this invention be limited only to the scope of the appended claims.

I claim:

1. In propeller manufacture, the method of forming a relatively thin metal blank into the shape of a hollow member constituting a camber portion of a hollow blade which comprises deforming the metal centrally of said blank to an extent less than the thickness of the metal to provide a cupped portion and a flanged portion extending around the rim thereof, of removing the metal projecting above the flanged portion to form said blank with a flat surface on one side and a hollow surface on the other, and confining the blank in a die and deforming the same into the shape of a hollow blade camber portion with thickened edge portions.

2. In propeller manufacture, the method of forming a relatively thin tapered metal blank into the shape of a hollow member constituting a camber portion of a hollow blade which comprises, deforming the metal centrally of said blank and to an extent less than the metal thickness but in increasing proportion towards the minimum thickness of said blank to provide a cupped portion and a flanged portion extending around the rim thereof, of removing the metal projecting above the flanged portion to form said blank with a flat face on one side and a hollowed surface on the other and confining the blank in a die and deforming the same into the shape of a hollow blade camber portion with edge portions having transverse metal thicknesses progressively decreasing longitudinally but relatively increasing with respect to corresponding central portions.

3. The method of making a hollow blade which comprises, deforming two separate relatively thin tapered metal blanks to an extent less than the metal thickness to provide each blank with a cupped projection and a flange extending around the rim thereof, of removing the metal projecting above the flanges of said blanks to form said blanks respectively with a flat face on one side and a hollowed surface on the other, confining the blanks in dies and deforming the same into the camber shapes of a hollow blade with thickened edge portions, of trimming the edges of said cambered blanks to provide the leading and trailing edges of the blade, of assembling said cambered blanks and uniting the same by fusion welding the adjoining surfaces.

4. The method of making a hollow blade which comprises, deforming two separate relatively thin tapered metal blanks to an extent less than the metal thickness to provide each blank with a cupped projection and a flange extending around the rim thereof, of removing the metal projecting above the flanges of said blanks to form said blanks respectively with a flat face on one side and a hollowed face on the other, confining the blanks in dies and deforming the same into the camber shapes of a hollow blade with thickened edge portions, of trimming the edges of said cambered members to provide the leading and trailing edges of the blade and to obtain a surface contact of said edges to an extent equal at least to the maximum metal thickness of one of said edge portions, of assembling said cambered members and uniting the same along the edges by depositing metal between the adjoining surfaces of the assembly.

5. The method of making a hollow blade which comprises, deforming two separate relatively thin tapered metal blanks to an extent less than the metal thickness to provide each blank with a cupped projection and a flange extending around the rim thereof, of removing the metal projecting above the flanges of said blanks to form said blanks respectively with a flat face on one side and a hollowed face on the other, confining the blanks in dies and deforming the same into the camber shapes of a hollow blade with thickened edge portions, of trimming the edges of said cambers to provide the leading and trailing edges of the blade and to obtain a surface contact of said edges to an extent equal at least to the maximum metal thickness of one of said edge portions, of assembling said cambers and uniting the same along the edges by depositing metal between the adjoining surfaces of the assembly, and brazing the adjoining edges, while said assembly is heated, with a spelter that melts at about the temperature of the heated assembly that flows between the contacting surfaces.

6. The method of making a hollow steel blade which comprises, deforming two separate relatively thin tapered metal blanks to an extent less than the metal thickness to provide each blank with a cupped projection and a flange extending around the rim thereof, of removing the metal projecting above the flanges of said blanks to form said blanks respectively with a flat face on one side and a hollow face on the other, confining the blanks in dies and deforming the same into the camber shapes of a hollow blade with thickened edge portions, of trimming the edges of said cambers to provide the leading and trailing edges of the blade and to obtain a surface contact of said edges to an extent equal at least to the maximum metal thickness of one of said edge portions, of assembling said cambers, and brazing the adjoining edges and filleting the inner seam thereof by flowing a spelter having an affinity for steel alloy between and along the seam of the contacting surfaces while heated.

7. In the manufacture of propellers, the process which consists of, forming a metal blade with a hollow in the blade portion and of flowing metal having suitable wetting properties along the inner plan periphery of said blade to form said blade with a fillet thereat, and thereby improve the strength qualities of the blade by preventing stress concentration at said seam.

8. In propeller manufacture, the method of forming a relatively thin metal blank into the shape of a hollow member constituting a camber portion of a hollow blade which comprises deforming the metal centrally of said blank to an extent less than the thickness of the metal to provide a cupped portion and a flanged portion extending around the rim thereof, of removing the metal projecting above the flanged portion to form said blank with surfaces of different contour and confining the blank in a die and deforming the same into the shape of a hollow blade camber portion with thickened edge portions.

9. In propeller manufacture, the method of forming a relatively thin tapered metal blank into the shape of a hollow member constituting a camber portion of a hollow blade which comprises, deforming the metal centrally of said blank and to an extent less than the metal thickness but in increasing proportion towards the minimum thickness of said blank to provide a cupped portion and a flanged portion extending around the rim thereof, of removing the metal projecting above the flanged portion to form said blank with surfaces of different contour and confining the blank in a die and deforming the same into the shape of a hollow blade camber portion with edge portions having transverse metal thicknesses progressively decreasing longitudinally but relatively increasing with respect to corresponding central portions.

10. The method of making a hollow blade which comprises, deforming two separate relatively thin tapered metal blanks to an extent less than the metal thickness to provide each blank with a cupped projection and a flange extending around the rim thereof, of removing the metal projecting above the flanges of said blanks to form said blanks respectively with surfaces of different contour, confining the blanks in dies and deforming the same into the camber shapes, of a hollow blade with thickened edge portions, of trimming the edges of said cambered blanks to provide the leading and trailing edges of the blade, of assembling said cambered blanks and uniting the same permanently.

11. In the manufacture of a hollow metal aircraft propeller blade, the steps which include forming outer and inner ferrous metal camber members, joining said members into a hollow blade structure and forming a cuprous metal fillet within such structure between said members and adjacent the leading and trailing edges of the blade.

12. In the manufacture of a hollow metal aircraft propeller blade, the steps which include forming outer and inner ferrous metal camber members, uniting said members to form the hollow blade structure by a metal weld extending substantially throughout the peripheral edge of one said camber member, and forming a cuprous metal fillet within the hollow of the blade adjacent to the welded joint between said members.

13. In the manufacture of a hollow metal aircraft propeller blade, the steps which include separately forming outer and inner ferrous metal camber members, uniting said members to form the hollow blade structure by a metal weld extending substantially throughout the peripheral edge of one said camber member, and forming a cuprous metal fillet within the hollow of the blade adjacent to the welded joint between said members.

14. In the manufacture of a hollow metal aircraft propeller blade, the steps which include separately forming outer and inner ferrous metal camber members, placing said members edge to edge, uniting the edges of the juxtaposed members by a metallic bond to thereby form the hollow blade structure, and introducing within the hollow of said structure and adjacent to the bond seam a cuprous metal fillet.

15. In the manufacture of a hollow metal aircraft propeller blade, the steps which include separately forming two ferrous metal blade members, uniting said members to form a hollow blade structure by a metallic bond extending substantially throughout the peripheral edge of one said member, and after effecting said bond further uniting said blade members along the bond seam by introducing into the hollow blade a cuprous fillet at a temperature substantially below the temperature required to effect said bond.

16. In the manufacture of a hollow ferrous metal propeller blade having an open end, the steps which include the formation of the hollow blade from camber members laid one upon the other, uniting said members by a weld seam extending substantially throughout the peripheral edge of one said member, and after effecting said weld, and at a lower temperature than that required to effect the seam, further uniting said members by means of a cuprous metal fillet extending substantially throughout the length of said seam, the filleting being accomplished by the introduction of the cuprous metal into the hollow of said blade through its open end.

17. As an article of manufacture, a hollow ferrous metal aircraft propeller blade including separately formed blade members having surface portions adapted to complement one another, said members being superimposed one upon another in acutely angled relation with said complemental surface portions juxtaposed, and a bond between said members formed by the use of a non-ferrous metal fused between the complemental surface portions of said members as well as between the adjacent acutely angled interior surfaces thereof, said bond throughout that portion of the extent thereof lying between said acutely angled member surface portions being concavedly filleted to increase the strength of the bond and at the same time avoid the concentration of stresses thereat.

18. As an article of manufacture, a hollow metal aircraft propeller blade including separately formed blade members each having a thickened peripheral edge, said members being superimposed one upon the other in acutely angled relation with their thickened edges juxtaposed, and a bimetallic bond between said members comprising a ferrous metal bond portion and a non-ferrous metal bond portion fused respectively between the juxtaposed thickened edges and between the adjacent acutely angled interior surfaces of said members, the non-ferrous metal portion of the bond being concavedly filleted to not only increase the strength of the bond but to avoid the concentration of stresses at the ferrous metal portion thereof.

HOWARD H. COUCH.